Patented Oct. 19, 1926.

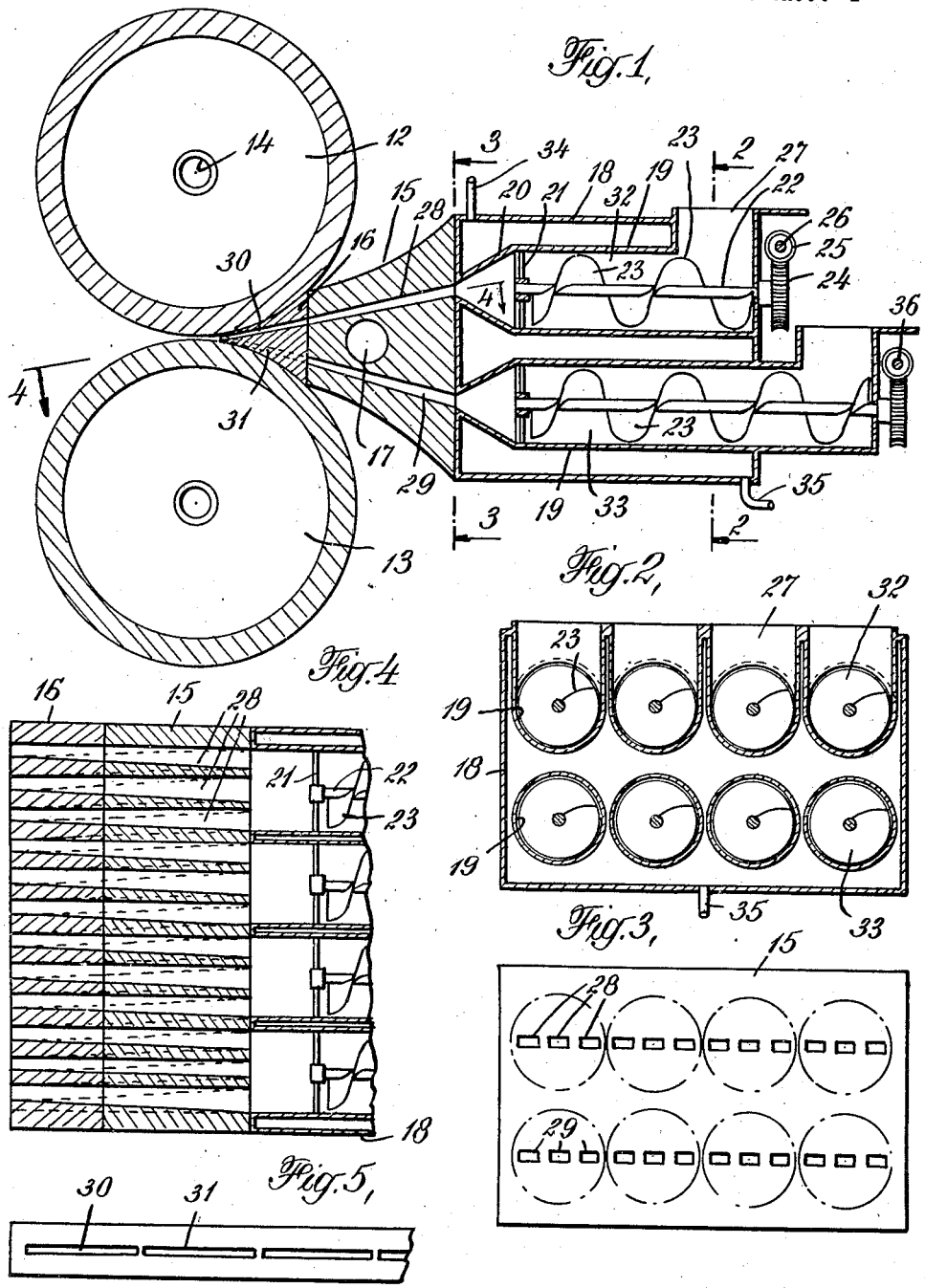

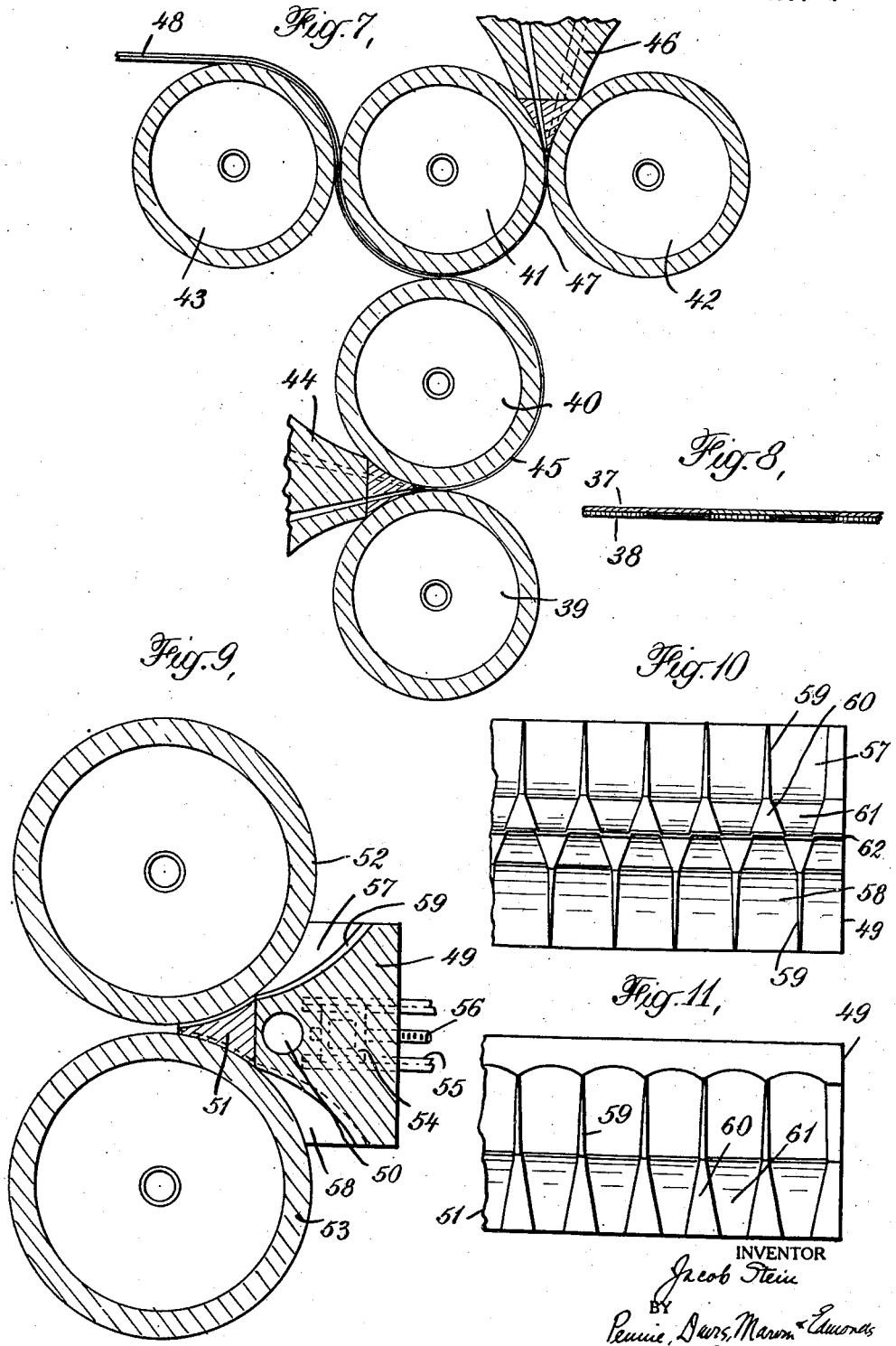

1,603,813

UNITED STATES PATENT OFFICE.

JACOB STEIN, OF NEW YORK, N. Y.

APPARATUS FOR MAKING STRIPED RUBBER SHEETING.

Application filed November 8, 1924. Serial No. 748,616.

This invention relates to an improved rubber product and to an apparatus by which it may be produced. The product referred to is a striped rubber sheeting made up of a plurality of different colored strips united autogenously along their abutting edges so as to produce a homogeneous sheet of uniform strength and thickness. The apparatus is intended to produce such a product continuously in a single operation so that masses of plastic rubber compound may be sheeted out in the form of striped rubber sheets of indefinite length of any selected width and thickness and having strips of different colors arranged in any desired pattern. This apparatus is useful not only for the production of a sheet as above described of single thickness, but may also be used for the production of a double faced sheet; that is, a sheet, each face of which is made up of stripes of selected colors and widths continuously sheeted out from plastic rubber compounds, two such sheets being united face to face into a homogeneous sheet having a thickness equal to the combined thicknesses of the parts of which it is made up.

The production of striped rubber sheeting has heretofore been carried on in several ways, none of which is altogether satisfactory. According to one method, a sheet of rubber is first formed and then strips of a contrasting color cut from a sheet are cemented to this first sheet of rubber in the proper spaced relation. The production of such material is difficult and expensive, by reason of the care which must be taken in cementing the strips in place, and the finished product is not of uniform thickness. Furthermore, this material is not a satisfactory product because under certain conditions the cement may deteriorate or for some other reason permit the strips to become loosened and dislodged. In this method the rubber materials employed are vulcanized or cured prior to the formation of the finished product. In another method for the production of this striped rubber material, rubber is used in the unvulcanized form, and sheets of unvulcanized rubber of the desired colors are laid face to face and passed beneath a knife mechanism which makes a cut extending lengthwise of the sheets. In such a cutting operation the edges of the two sheets are forced together and united. After the material has been cut the two sheets are opened up and laid flat so as to lie substantially in the same plane, and they are then passed through rolls which flatten them at the line of union. By reason of the manner in which the edges are united, it will be seen that the sheets are not connected together by the adhesion of their edges, but the union is, in part, produced by the adhesion of portions of the faces of the two sheets which lie in contact. After the formation of a pair of connected strips in this manner, the process is repeated to add another strip, and eventually, by continued repetition, a sheet is built up of the desired width. It will be clear that the formation of a sheet by this process is extremely laborious and time-consuming, and great care must be taken in order to have the stripes of uniform width. Also, the individual strips which make up the sheet are not firmly bound together and there is a possibility that an added thickness of the material may occur along the joint.

It will be seen that both processes above described are based on the use of sheeted rubber material, consequently, the sheeting out of the rubber from the plastic rubber masses must first occur, and thereafter the building up of the striped rubber sheet takes place. Furthermore, these processes are not continuous in the sense that the complete product is continuously produced, but, on the contrary, certain steps in the processes must be repeated many times before the finished product is made.

The present invention is intended to provide apparatus by which a striped rubber sheeting may be made, which is homogeneous throughout and of uniform strength and thickness. This sheeting may be either single or double; that is, may be made as a sheet of single thickness in which the rubber which forms the separate strips extends throughout the thickness of the sheet, or else it may be made up of a pair of such sheets united face to face in such a way as to form a single, substantially homogeneous sheet. The apparatus, furthermore, produces this sheeted material in a single operation. The plastic rubber mix is fed to the apparatus at one end and from the other the striped sheeting is withdrawn. The operations of sheeting out the material from the plastic masses and of uniting suitably formed strips into a single sheet, are continuously carried on so that a sheet of indefinite length may be produced.

The apparatus which forms the subject matter of this invention involves the use of calender mills such as are now ordinarily employed in rubber manufacture. In the production of striped rubber sheets of single thickness, it is preferable to use an apparatus in which a three roll calender is employed, while for the manufacture of double sheets, the apparatus involves the use of five rolls. In either case the apparatus includes means for feeding plastic rubber compounds through suitably formed channels which deliver strips of rubber of the desired width and thickness, a plurality of such strips being delivered in a plane between the bite of a pair of calender rolls so arranged that the pressure exerted by the rolls causes the strips to unite edgewise into a single sheet. The form of the feeding mechanism employed will, to some extent, depend upon the arrangement of the different colored rubbers in the final product, but for the production of a sheet of the simplest form; that is, a single sheet having alternate stripes of two different colors and equal width, the feeding mechanism will include a channel for each of these stripes and rubber will be fed by appropriate devices through each of the channels. The feeding devices may feed one or more of the channels, but the devices are separately arranged so that that part of the mechanism which delivers strips of one color is wholly separate from that part which delivers strips of the other color. Rubber of the selected colors is placed in these feeding devices and strips of rubber are continuously formed and immediately united to produce a sheet the width of which depends on the number of stripes which appear in it. This apparatus, therefore, is fed with plastic rubber compounds at one end and striped rubber sheeting is delivered from the other end.

The apparatus above described is used with slight modifications for the production of a double faced sheeting. In this case two separate feeding mechanisms are employed and appropriate rolls co-act with the feeding mechanism so as to produce separate striped rubber sheets, one of which is caused to be delivered upon the other, immediately before the passage of both sheets through a pair of rolls which cause them to be united into a single sheet of double thickness. Also, instead of using power-driven feeding devices, I contemplate the use of a feed block having recesses on its opposite faces, these recesses being divided into channels by the formation of ridges and depressions in the block. This block will have surfaces which bear against the faces of a pair of calender rolls so that the surface of the rolls serves to close the channel along one side. Plastic rubber compounds are then placed in the recesses on either face of the block, and the rolls draw this material through the channels which thus serve to deliver strips in the appropriate relation. These strips pass at once through the rolls and are united into a single homogeneous sheet.

I have above briefly outlined the production of striped rubber material of single and double thickness. I also contemplate the production of a striped rubber material of single thickness having a fabric backing sheet applied to it during the course of its manufacture in my apparatus, and also the production of a material of double thickness, between the faces of which is introduced a fabric sheet during the course of the manufacture.

For a better understanding of the novel rubber product and the apparatus by which it is made, reference will now be made to the accompanying drawing, in which there is shown that embodiment of the invention which is now considered preferable. In these drawings, Fig. 1 is a view in vertical cross-section of a part of the mechanism used in the production of a striped sheet of single thickness, Fig. 2 is a cross-sectional view on the line 2—2 of Fig. 1, Fig. 3 is a cross-sectional view on the line 3—3 of Fig. 1, Fig. 4 is a cross-sectional view on the line 4—4 of Fig. 1, showing the channels through the feed block, Fig. 5 is an end view of a part of the mechanism, showing the delivery ends of the channels, Fig. 6 is a cross-sectional view of a portion of a rubber sheet of single thickness, Fig. 7 is a view in cross-section, showing the assembly of the apparatus used in the production of a sheet of double thickness, Fig. 8 is a cross-sectional view of a portion of a sheet of double thickness, Fig. 9 is a cross-sectional view of a modified form of the invention, Fig. 10 is an end view of the feed block used in Fig. 9, and Fig. 11 is a plan view of this feed block.

Referring now to these drawings, the apparatus illustrated in Figs. 1 to 5 is intended for the production of a sheet of striped rubber of single thickness, and this apparatus includes a three mill calender of well-known construction. In Fig. 1, two of the calender rolls are illustrated, being designated as 12 and 13. The complete mill has not been illustrated because the construction is well known. It consists of uprights in which the rolls are suitably supported and driven by gearing from any convenient source of power. Three rolls are normally employed, but two of which have been shown in the drawings. These rolls are of steel and are hollow so that steam may be introduced into their interior through inlet 14. In this arrangement the rolls are relatively adjustable by well known mechanism so that the space between their surfaces can be regulated as may be desired and in general the construction is that ordinarily employed in calender mills such as are in common use in rubber manufacture.

Mounted in any convenient manner at one side of the rolls is the feeding apparatus which here consists of a feed block 15, terminating in an extension 16, the opposite faces of which are curved to correspond to the contour of the rolls. The feed block is provided with a passage 17 through which steam may be led so that the feed block may be maintained at a suitable temperature, and at the rear of the feed block is mounted a casing 18, in which the feeding mechanism proper is disposed. A plurality of feeding devices are illustrated, but one of which need be described.

Within the housing 18 is a tubular member 19, which terminates at its forward end in a converging portion 20. At the end of the tubular member 19, adjacent the converging end portion, is a spider 21 which provides a bearing for the shaft 22, on which is mounted a worm blade 23. The shaft 22 extends to the rear end of the casing 18 and carries a worm gear 24, meshing with a similar gear 25 on a shaft 26. At its rear end the tubular member 19 has an opening 27, through which plastic rubber material may be introduced into the path of travel of the worm. At the forward end the converging portion 20 communicates with one or more channels 28, formed in the feed block. As illustrated more clearly in Fig. 4, there are three such channels 28, each of which is shown as tapering toward the forward end of the feed block. These channels lie substantially in a plane and the rubber compound which is introduced into the feeding device through the opening 27 will be fed forwardly through the device by the rotation of the worm, and then forced through the channels 28. In the arrangement illustrated there are four upper feeding devices, similar to that just described, and there are also four similar feeding devices within the housing, placed in a second lower row. The construction of the feeding devices is the same throughout, but the channels 29 from the lower row of feeding devices pass upwardly and their openings lie between the openings of the channels of the upper row. As shown in Fig. 5, for example, the delivery opening 30 is connected with an upper channel 28. The delivery opening 31 is connected with a lower channel 29, so that the rubber material placed in the feeding device 32 will be delivered in the form of strips which alternate with the strips delivered through the channels connected with the lower feeding device 33. By this arrangement it is possible to produce a striped material having stripes of two different colors by feeding plastic rubber compound of one color into all of the upper row of feeding devices, and raw rubber of a second color into all of the feeding devices of the lower row. The rubber is forced forwardly through the channels in the feed block by the feeding mechanism and then is delivered between the rolls 12 and 13 from the end of the feed block. The strips of rubber delivered from the ends of these channels are placed in alternate relation, as respects color, and as the strips pass from the ends of the block they are gripped between the two rolls and subjected to pressure sufficient to cause them to spread laterally so that their edges are forced into intimate contact and, in fact, autogenously united. Consequently there is delivered from the rolls 12 and 13, a continuous sheet of striped rubber material, and the stripes extend throughout the thickness of the material and the sheet is of uniform strength and thickness.

It will be noted that the housing 18 is hollow and is provided with a steam inlet 34 and a steam outlet 35, so that the temperature of the feeding devices may be maintained at the proper value. Also, the shafts 26 and 36 by which the feeding devices are driven, are rotated from a single main drive shaft so that the rate of operation of the feeding devices is uniform.

In the device as illustrated, each of the feeding devices feeds three separate channels, but, if desired, each device could be used to feed a single channel. Also, while I have described how it is possible to use the device in the manufacture of striped sheeting in which two colors are employed, it will be evident that by using different colored materials in the different feeding devices, a sheet of more than two colors could be easily produced and, in fact, the variation in the pattern is extremely wide. Also, while the channels through which the feeding devices deliver the rubber to the rolls have been illustrated as being of the same width, it is evident that these channels might be made wider or narrower, as desired, thus varying the width of the stripes. For instance, if desired, it would be quite simple to alter the construction of the machine to make a sheet in which rubber material having alternate wide and narrow strips was produced. But in all of these materials it will be noted, by reference to Fig. 6, that the product differs from the striped sheetings heretofore employed, because the stripes are of material which extends completely through the sheets, and these stripes are united edge to edge with a uniformly strong adhesion. Furthermore, it will be seen that the production of the striped material is carried on as a single operation, coincident with the sheeting process; that is, raw rubber is introduced at one end of the machine and a striped rubber material is withdrawn at the other. It is not necessary first to make a rubber sheet and then to employ this rubber sheet for the production of the striped sheeting in the manner heretofore followed.

In Fig. 7 I have shown, in more or less diagrammatic form, an arrangement of the apparatus such as would be used for the production of a double sheeting, such as is illustrated in Fig. 8. In that figure it will be seen that the sheet consists of two faces 37 and 38. The face 37 is composed of wide stripes which may be of any desired colors, while the face 38 is made up of narrow stripes. As will presently be described, these two faces are produced separately and each facing sheet is produced according to the process previously described. Then the two facing sheets are united together so as to form a homogeneous double faced sheet. While the material illustrated in Fig. 8 consists of two faces, each of which is striped with stripes of different thicknesses, it will be clear that it would be a simple matter to use the apparatus for the production of material in which the stripes appearing on both faces were of the same color and of the same width. Such a sheet would, therefore, have the appearance of a sheet of single thickness, but, of course, would be of greater weight. Also, it would be possible to have one sheet of plain rubber, in which case the sheet would have the desired double thickness, but the outer face would have the striped appearance. Such a sheet would, of course, be very superior to the striped rubber materials heretofore employed, because the two faces being formed of uncured rubber, can be forced into an intimate contact, such that the two faces actually unite in a manner similar to the welding of metals, and consequently the sheet is homogeneous and without local weaknesses.

In the apparatus illustrated in Fig. 7, a five roll calender is employed. The rolls 39, 40, 41, and 42 are heated rolls, and the roll 43 may be kept cold. These rolls are of the usual construction, commonly employed in calender mills, and are driven by suitable mechanism. The roll 40 is fixed in position, while the rolls 39 and 41 are adjustable relatively thereto in a vertical plane. Also, the rolls 42 and 43 are adjustable relative to the roll 41 in a horizontal plane. Associated with these rolls are two feeding devices, only parts of which are illustrated. A lower feed block with its associated feeding mechanism is shown at 44 and the block delivers to the bite of the rolls 39 and 40 a series of strips of rubber of appropriate colors, which are united into a single sheet by passage through these rolls. This sheet 45 travels upwardly around the roll 40 to the bite of the rolls 40, 41. A second feeding block with its associated feed mechanism is placed as indicated at 46 and this delivers a series of strips of rubber to the bite of the rolls 41, 42, where the strips are united into a sheet 47. The two sheets are then led between the bite of the rolls 40, 41, where they are united into a single sheet and are then carried around the roll 41, between rolls 41, 43, and are finally led off in the form of a double sheet at 48. The construction of the separate feeding devices is similar to that previously described, and the operation will be readily understood from what has gone before.

While I have now described the preparation of both single and double sheets by the use of my apparatus, it will be clear that it would be possible to produce by the use of this apparatus, a sheet having a single facing of rubber with a fabric backing layer, or a double sheet having two rubber facings with a fabric reinforcing layer placed between them. In the construction of the single sheet the fabric would be drawn between one face of one roll, and the feed block, so that as the strips of rubber are delivered from the feed block, the fabric carried along with the rubber strips will be carried between the bite of the rolls with the strips. Thus the pressure to which the strips are subjected and which serves to cause the strips to be united, edge to edge, will also force the rubber into the interstices of the fabric, thus firmly uniting the rubber facing to the fabric backing. For the production of a double sheet having a reinforcing layer between the two rubber faces, it would only be necessary to mount a supply of the fabric in some convenient location so that the fabric could be drawn between the rubber sheets 45 and 47, through the bite of the rolls 40, 41. The two soft rubber sheets would then be caused to unite firmly with the fabric placed between them.

In Figs. 9, 10, and 11 I have illustrated a modified form of the invention in which a simple type of feed block is used, and with which no power-driven feeding mechanism is necessary. This feed block 49, which is steam heated by the flow of steam through a passage 50 formed in the body of the block, has an extension 51, which lies in contact with the surfaces of the pair of rolls 52, 53, similar to those previously described. The feed block is supported by means of lugs 54, extending beyond the ends of the feed block and resting in guides 55. By means of an adjusting screw 56 the position of the block with reference to the rolls may be regulated. In its upper and lower surfaces the block is provided with recesses 57 and 58, and the bottom of each recess is provided with parallel ridges 59, shown more clearly in Fig. 10. These ridges extend down over the face of the extension 51, where they widen as indicated at 60, thus forming tapering channels 61, the tops of which are closed by the surface of the rolls 52, 53. It will be observed that the ridges 59 in one face of the block are staggered with relation to the similar ridges placed in the opposite face of the block, so that the delivery channels extending forwardly from one recess alternate with those which are in communication with the recess in the opposite face of the block, and the forward edge 62 of the block is so formed that the ends of the delivery channels lie substantially in a plane.

In the use of this type of mechanism plastic rubber compounds of different colors are placed in the opposite recesses of the block, and the rubber is drawn through the channels by the action of the rolls. The rubber so drawn from the plastic masses is delivered in the form of strips, with the strips from one supply alternating with those from the other. Thus, by making use of supplies of different colors, it is possible to make a sheet having alternating strips of the two colors. With this type of apparatus the strips may be of any desired width, as, for instance, a sheet may be formed in which narrow stripes alternate with wide ones. Also, by the use of suitable partitions formed in the block, and subdividing the recesses, more than two different kinds of plastic material may be used, so that a sheet may have a series of strips of two colors at one part of the sheet and then a series of stripes of different colors may be formed in the sheet. By changing the design of the block in the manner indicated, various types of sheeting may be produced having stripes of any selected width and having these stripes formed of colors in any desired order. It is to be understood that the striped rubber sheeting, either with or without the backing or reinforcing sheet, which is produced in this machine is not in the final form suitable for commercial use, but the rubber must be subjected to the usual vulcanization process. Such treatment, however, forms no part of the present invention and is not described herein. Also it is immaterial so far as this invention is concerned, as to the composition of the rubber compounds which are used in the production of the striped rubber material. These compounds are prepared by well-known methods and will have colors according to the requirements of the pattern of the finished material. The preparation of such rubber compounds is also well-known and need not be described.

It will be seen that the apparatus here described makes it possible to make a striped rubber sheeting which has superior qualities to those heretofore produced. Furthermore, this sheeting may be made by the use of the apparatus described in indefinite lengths and widths, and may have any desired pattern, both with regard width of stripes and as to the colors employed. The striped product is produced as rapidly as ordinary sheeting could be made by the usual mills employed for the purpose, and because of the fact that no manual labor is required in cutting the stripes or in putting them in position, but on the contrary the operation is entirely automatic, the product is uniform both in appearance and in quality, and its cost is much less than the striped products as manufactured by these manual processes.

This application is a continuation in part of my application, Serial Number 689,420, filed January 30, 1924.

I claim:

1. An apparatus for making striped rubber sheeting comprising the combination of a pair of driven rolls and a plurality of means disposed at one side of the rolls for forming and feeding between these rolls a plurality of individual strips of rubber lying side by side, the said means being substantially co-extensive and extending side by side in the direction of the roll axes.

2. An apparatus for making striped rubber sheeting which comprises the combination of a pair of driven rolls, means for forming a plurality of individual strips of rubber, and means for directing these strips side by side into the bite of the rolls.

3. An apparatus for making striped rubber sheeting which comprises the combination of a pair of driven rolls, and a plurality of means disposed adjacent the bite of the rolls, each of the said means being operable to direct a plurality of strips of rubber side by side between the rolls, the strips of different groups directed by the several means to the rolls being arranged in alternation.

4. An apparatus for making striped rubber sheeting which comprises the combination of a pair of driven rolls, a plurality of guide channels having their delivery ends placed side by side at one side of the bite of the rolls, and means for feeding rubber from different supplies through groups of the said channels to be delivered to the rolls.

5. An apparatus for making striped rubber sheeting which comprises the combination of a pair of driven rolls, means for feeding rubber from a plurality of supplies and forming the rubber so fed into strips, and means engaging the faces of the rolls for directing these strips between the rolls side by side.

6. An apparatus for making striped rubber sheeting which comprises the combination of a pair of driven rolls, a feed block disposed at one side of the rolls, a plurality of tapering passages formed in the feed block, and means for feeding rubber through the passages.

7. An apparatus for making striped rubber sheeting which comprises the combination of a pair of driven rolls, a feed block mounted at one side of the rolls, a plurality of tapering channels disposed within the feed block, these channels having delivery ends lying close to the bite of the rolls and substantially in a plane, and means for feeding rubber through the channels to be delivered to the rolls in the form of strips.

8. An apparatus for making striped rubber sheeting which comprises the combination of a pair of driven rolls, a feed block terminating in an extension having faces engaging the surfaces of the rolls, passages formed through the feed block and the extension, these passages having delivery ends lying substantially in a plane, and individual feeding means for feeding rubber through the passages.

9. An apparatus for making striped rubber sheeting which comprises the combination of a pair of driven rolls, a feed block disposed opposite the bite of the rolls and terminating in an extension having surfaces engaging the roll surfaces, a plurality of passages arranged within the feed block in two converging planes, the delivery ends of the passages lying close to the bite of the rolls and substantially in a plane, and a plurality of feeding devices for feeding rubber through the passages.

10. An apparatus for making striped rubber sheeting which comprises the combination of a pair of driven rolls, a plurality of devices for feeding rubber arranged in upper and lower rows, and a feed block interposed between the feeding devices and the rolls and having individual passages therethrough leading to separate feeding means, this feed block terminating at a point close to the bite of the rolls, and the passages extending through the feed block in converging planes with the delivery ends of the passages lying in one plane alternating with the delivery ends of the passages lying in the other plane.

11. An apparatus for making striped rubber sheeting, which comprises the combination of a pair of rolls, means adjacent the bite of the rolls for directing a plurality of strips side by side through the rolls, a second pair of rolls, one of which lies in cooperating relation with a roll of the first pair, and means adjacent the bite of the second pair of rolls for directing a plurality of strips side by side between the rolls, the sheets formed by the passage of the strips through each pair of rolls being led through the rolls which are in cooperating relation whereby the sheets are united face to face into a single sheet of double thickness.

12. An apparatus for making striped rubber sheeting, which comprises the combination of a pair of rolls arranged one above another in a vertical plane, a second pair of rolls lying side by side in a horizontal plane, one of the rolls of the second pair lying in the plane in which the first pair is disposed and in cooperating relation to one of the rolls of the first pair, and means adjacent the bite of each pair of rolls for directing a plurality of strips of rubber side by side between the rolls, the sheets so formed being led between the rolls which are in cooperating relation, whereby the sheets are united into a single sheet of double thickness.

13. An apparatus for making striped rubber sheeting which comprises the combination of a pair of driven rolls, a feed block at one side of the rolls and having an extension terminating close to the bite of the rolls, a plurality of passages formed in the feed block, and means for feeding rubber from individual supplies through these passages, the said means including a plurality of feed chambers having driven worm blades therein, and having discharge outlets communicating with one or more of the feed passages.

14. In a device of the class described, the combination of a pair of driven rolls, a heated feed block disposed at one side of the rolls and terminating in an extension having its opposite faces lying in contact with the surfaces of the rolls, a plurality of passages formed through the feed block and extension, these passages having discharge outlets which lie side by side in the end of the extension, and means for feeding rubber through the passages to be discharged in the bite of the rolls, this means comprising a plurality of feed chambers having driven screw blades therein and having discharge outlets communicating with one or more of the passages all of said feed chambers being heated.

15. An apparatus for making striped rubber sheeting which comprises the combination of a pair of heated driven rolls, means for forming a plurality of strips of rubber from individual supplies, and means for directing these strips side by side into the bite of the rolls.

16. An apparatus for making striped rubber sheeting which comprises the combination of a pair of driven rolls, a block at one side of the rolls terminating in an extension having opposite faces in contact with the rolls, a plurality of series of passages formed in the block and extension, these series of passages extending rearwardly from the extension in diverging planes, and means for feeding rubber through the passages.

17. An apparatus for making striped rubber sheeting which comprises the combination of a pair of driven rolls, a feed block at one side of the rolls terminating in an extension, the edge of which lies substantially at the bite of the rolls, a plurality of series of tapering passages lying in planes diverging rearwardly from the edge of the extension, the discharge outlets of the passages in this edge lying substantially in a plane, and the outlets of the passages of the several series being located in staggered relation therein, and means for feeding rubber from separate supplies into the several passages.

18. An apparatus for making striped rubber sheeting which comprises the combination of a pair of driven rolls, a feed block adjacent the rolls, and means in the feed block for directing rubber through the rolls in a plurality of individual strips, the said means terminating at one side of the point where the rolls are closest together to permit the strips to be united autogenously by pressure exerted by the rolls as the strips pass through them.

19. An apparatus for making striped rubber sheeting which comprises the combination of a pair of driven rolls, a wedge-shaped feed block mounted at one side of the rolls and terminating in an extension having surfaces adapted to bear against the faces of the rolls, a plurality of channels formed in the face of the feed block and in the extension, the discharge ends of the channels at the edge of the extension lying substantially in a plane with the channels formed in one face alternating with those formed in the other, and recesses formed in the feed block in communication with the channels for receiving supplies of rubber.

20. An apparatus for making striped rubber sheeting which comprises the combination of a pair of rolls, a feed block at one side of the rolls terminating in an extension, the edge of which lies close to the bite of the rolls, a plurality of passages formed in the feed block and extension, individual means for feeding rubber through the passages, and a single drive mechanism for driving the feeding means at the same rate.

In testimony whereof I affix my signature.

JACOB STEIN.